US011155649B2

(12) United States Patent
Wolf et al.

(10) Patent No.: US 11,155,649 B2
(45) Date of Patent: Oct. 26, 2021

(54) PROCESS FOR THE PREPARATION OF ETHYLENE HOMOPOLYMERS OR COPOLYMERS

(71) Applicant: Basell Polyolefine GmbH, Wesseling (DE)

(72) Inventors: Christoph Wolf, Pulheim-Dansweiler (DE); Dieter Littmann, Mücke (DE); Michael Deuerling, Weilerswist (DE); Andre-Armand Finette, Cologne (DE); Danir Khayrullin, Bruehl (DE); Juergen Mohrbutter, Alfter (DE)

(73) Assignee: Basell Polyolefine GmbH, Wesseling (DE)

( * ) Notice: Subject to any disclaimer, the term of this patent is extended or adjusted under 35 U.S.C. 154(b) by 60 days.

(21) Appl. No.: 16/636,804

(22) PCT Filed: Aug. 16, 2018

(86) PCT No.: PCT/EP2018/072169
§ 371 (c)(1),
(2) Date: Feb. 5, 2020

(87) PCT Pub. No.: WO2019/034718
PCT Pub. Date: Feb. 21, 2019

(65) Prior Publication Data
US 2020/0369792 A1    Nov. 26, 2020

(30) Foreign Application Priority Data

Aug. 17, 2017    (EP) .................................... 17186697

(51) Int. Cl.
*C08F 2/01*    (2006.01)
*B01J 3/00*    (2006.01)
(Continued)

(52) U.S. Cl.
CPC ................. *C08F 2/01* (2013.01); *B01J 3/008* (2013.01); *B01J 3/042* (2013.01); *B01J 19/0053* (2013.01);
(Continued)

(58) Field of Classification Search
USPC ............................................ 526/64; 422/134
See application file for complete search history.

(56) References Cited

U.S. PATENT DOCUMENTS

| 2007/0032614 A1 | 2/2007 | Goossens et al. |
| 2011/0275770 A1 | 11/2011 | Lammens et al. |

(Continued)

FOREIGN PATENT DOCUMENTS

| RU | 2575929 C2 | 2/2016 |
| RU | 2613070 C2 | 3/2017 |

(Continued)

OTHER PUBLICATIONS

The International Search Report and Written Opinion for PCT/EP2018/072169 dated Oct. 17, 2018.

*Primary Examiner* — Fred M Teskin (57) ABSTRACT

A process for the preparation of ethylene homopolymers or copolymers in a facility having a high-pressure tubular reactor and a preheater, wherein a reaction fluid introduced into the reactor at a reactor inlet is heated in the preheater and the average velocity of the reaction fluid in the preheater is lower than the average velocity of the reaction fluid in the tubular reactor and the ratio of the average velocity in the tubular reactor to the average velocity of the reaction fluid in the preheater is in the range from 1.5 to 5.

19 Claims, 3 Drawing Sheets

(51) Int. Cl.
    *B01J 3/04*     (2006.01)
    *B01J 19/00*    (2006.01)
    *B01J 19/24*    (2006.01)
    *C08F 10/02*    (2006.01)

(52) U.S. Cl.
    CPC ........... *B01J 19/2415* (2013.01); *C08F 10/02* (2013.01); *B01J 2219/00103* (2013.01); *B01J 2219/00164* (2013.01)

(56) References Cited

U.S. PATENT DOCUMENTS

2011/0294967 A1   12/2011   Littmann et al.
2014/0135459 A1*  5/2014    Karjala .................. C08F 10/02
                                                        526/64

FOREIGN PATENT DOCUMENTS

| WO | 2007018871 A1 | 2/2007 |
| WO | 2007051561 A1 | 5/2007 |
| WO | 2012084772 A1 | 6/2012 |
| WO | 2015082565 A1 | 6/2015 |
| WO | 2016075235 A1 | 5/2016 |

\* cited by examiner

PROCESS FOR THE PREPARATION OF ETHYLENE HOMOPOLYMERS OR COPOLYMERS

This application is the U.S. National Phase of PCT International Application PCT/EP2018/072169, filed Aug. 16, 2018, claiming benefit of priority to European Patent Application No. 17186697.3, filed Aug. 17, 2017, the disclosures of which are incorporated herein by reference in their entirety.

FIELD OF THE INVENTION

The present disclosure provides a process for the preparation of ethylene homopolymers or copolymers in a facility comprising a high-pressure tubular reactor.

BACKGROUND OF THE INVENTION

Ethylene polymers may be formed in high-pressure polymerization processes. Individual steps in such processes are the compression of the reaction mixture to the reactor pressure, introduction of an initiator in at least one stage, polymerization while removing exothermic heat of reaction, product separation and further processing. For said processes, different types of reactor design may be used. One class of reactors to form low density ethylene-based polymers are tubular reactors.

A common set-up of a facility for preparing low density ethylene homopolymers or copolymers comprises, besides the polymerization reactor, further equipment. The reaction components are usually pressurized by a combination of two compressors, a primary compressor and a secondary compressor. At the end of the polymerization sequence, a high-pressure polymerization facility normally further includes apparatuses like extruders and granulators for pelletizing the obtained polymer. Furthermore, such a facility generally also comprises means for feeding monomers and comonomers, free-radical initiators, chain transfer agents or other substances at one or more positions to the polymerization reaction. A process and an apparatus for the manufacture of ethylene polymers and copolymers under high pressures are for example disclosed in WO 2007/018871 A1.

The reaction gas composition discharged by the secondary compressor and supplied to the inlet of the reactor is commonly heated, generally by a heating jackets operated by steam, hot water or a combination thereof. These heating elements for heating the reaction gas composition before arriving at the reactor inlet are known as preheater. For example, WO 2007/051561 A1 discloses an apparatus and method for the production of polyethylene and ethylene copolymers in which the preheater comprises three sections and the preheater sections are supplied with steam from a medium pressure steam net and with high pressure steam.

The properties and the structure of the produced ethylene homopolymers or copolymers, such as molecular weight, molecular weight distribution and the amount of short- and long-chain branching, depend strongly on the reaction parameters. Furthermore, the feasible ethylene conversion in a reaction zone depends on the amount of polymerization heat, which can be removed from the reaction mixture in the respective reaction zone. That means, at a given start temperature, the ethylene conversion is the higher the higher the peak polymerization temperature is. However, under certain temperature and pressure conditions, ethylene decomposes rapidly in an explosive manner to give soot, methane and hydrogen. There is accordingly a need to carefully control the reaction conditions within the reactor. WO 2012/084772 A1 for example discloses a process for monitoring the polymerization of ethylene or ethylene and comonomers in the presence of free-radical polymerization initiator in a tubular reactor with one or more reaction zones, which is equipped with cooling jackets for cooling the tubular reactor with a cooling medium, comprising a step of measuring as process parameters the temperature profile and the pressure of the reaction medium and the flow and temperature profile of the cooling medium along the reactor.

However, the product quality in the above described processes may still vary over time due to fluctuations of the process conditions within the reactor. One reason for fluctuations of the process conditions are pressure pulsations induced by the secondary compressor.

There is accordingly a need to provide an improved heating system with a low pressure drop resulting in an increased conversion rate, wherein product quality is continuously high and pressure pulsations are avoided or at least reduced.

SUMMARY OF THE INVENTION

The present disclosure provides a process for the preparation of ethylene homopolymers or copolymers in a facility, the facility comprising a high-pressure tubular reactor used in a continuous flow mode with a reaction fluid comprising or consisting of ethylene being introduced into the reactor at a reactor inlet and polymer leaving the reactor at a reactor outlet and the facility further comprising a preheater having an inlet and an outlet, wherein the process comprises the following steps:
a) compressing the reaction fluid to an elevated pressure;
b) heating at least a portion of the reaction fluid in the preheater;
c) introducing the reaction fluid heated in step b) into the reactor at the reactor inlet; and
d) polymerizing the reaction fluid at the elevated pressure in the presence of free-radical polymerization initiators in the reactor, wherein the average velocity of the reaction fluid at the outlet of the preheater is lower than the average velocity of the reaction fluid in the tubular reactor at the reactor inlet and the ratio of the average velocity of the reaction fluid in the tubular reactor at the reactor inlet to the average velocity of the reaction fluid in the preheater at the outlet of the preheater is in the range from 1.5 to 5.

In some embodiments, in step a), a piston compressor is used for compressing of the reaction fluid.

In some embodiments, in step a), the pressure of the reaction fluid after compression ranges from 180 MPa to 320 MPa, and/or, in step c), when introducing the heated reaction fluid into the reactor, the pressure of the reaction fluid ranges from 175 MPa to 315 MPa.

In some embodiments, in step c), when introducing the heated reaction fluid into the reactor, the temperature of the reaction fluid ranges from 140° C. to 170° C.

In some embodiments, the preheater consists of two preheater units and a first preheater unit is arranged on a first branch line and a second preheater unit is arranged on a second branch line.

In some embodiments, the process comprises the following steps:
a') providing a first flow of compressed reaction fluid comprising a first portion of the reaction fluid and providing a second flow of compressed reaction fluid comprising a second portion of the reaction fluid by, in any order, compressing the reaction fluid to an elevated pressure and splitting at least a portion of a single flow of the reaction fluid into the first flow and the second flow of compressed reaction fluid;

b') conducting the first flow of the first portion of the reaction fluid through the first preheater unit and heating the first portion of the reaction fluid in the first preheater unit, and conducting the second flow of the second portion of the reaction fluid through the second preheater unit and heating the second portion of the reaction fluid in the second preheater unit;

c') combining the first and second portion of the reaction fluid by recombining the first flow and the second flow of the reaction fluid and introducing the recombined flow of the reaction fluid heated in step b') into the reactor at the reactor inlet; and d') polymerizing the reaction fluid at the elevated pressure in the presence of free-radical polymerization initiators in the reactor, In some embodiments, in step a'), a single flow of the reaction fluid is compressed to an elevated pressure and thereafter at least a portion of the flow is split at a junction appliance, into the first flow comprising the first portion of the reaction fluid and into the second flow comprising the second portion of the reaction fluid.

In some embodiments, the first preheater unit has first heating elements and the second preheater unit has second heating elements that are arranged at intervals and spaced apart from each other.

In some embodiments, the first and second heating elements are heated using a heating fluid and wherein some or all of the first heating elements are connected by heating pipelines to each other and some or all of the second heating elements are connected by heating pipelines to each other.

In some embodiments, the first heating elements have at least two subsets of first heating elements, wherein the first heating elements within each subset are connected by heating pipelines and wherein said subsets are not connected to each other by heating pipelines, wherein different heating fluids are used for heating each subset of first heating elements, wherein the second heating elements have at least two subsets of second heating elements, wherein the second heating elements within each subset are connected by heating pipelines and wherein said subsets are not connected to each other by heating pipelines, wherein different heating fluids are used for heating each subset of second heating elements, wherein the different heating fluids differ in pressure, composition, source of the heating fluid and/or temperature.

In some embodiments, the amount of heating elements arranged in or around the first and second branch line is the same and/or the length of the first and second branch line is the same.

In some embodiments, the first and second branch lines have straight sections that are partially or fully insulated using insulation elements, wherein the bends are not insulated with said insulation elements.

In some embodiments, the polymer obtained in step d) is a low-density polyethylene (LDPE).

In some embodiments, the reaction fluid comprises propionic aldehyde and/or propylene.

In some embodiments, the reaction fluid is a supercritical fluid in steps b) to d).

DETAILED DESCRIPTION OF THE INVENTION

The present disclosure relates to a process for the preparation of ethylene homopolymers or copolymers in a facility comprising a high-pressure tubular reactor. The high-pressure polymerization for preparing the ethylene homopolymers or copolymers may be carried out at pressures of from 110 MPa to 500 MPa, with pressures of from 160 MPa to 350 MPa being preferred and pressures of from 200 MPa to 330 MPa being particularly preferred. The polymerization temperatures are in the range of from 100° C. to 350° C. and preferably in the range of from 180° C. to 340° C. and more preferably from 200° C. to 330° C. for polymerization.

In a preferred embodiment of the process, the reaction fluid comprising or consisting of ethylene is brought to the polymerization pressure by one or more compressors in a sequence of compression stages. It should be understood that the term "fluid" can relate to a gas and/or a liquid, or the term can relate to a supercritical fluid.

A reaction mixture comprising polymer obtained by the polymerization leaves the reactor at the reactor outlet preferably through a pressure control valve and is optionally cooled by a post reactor cooler. The reaction mixture leaving the reactor is preferably separated into polymeric and gaseous components in two or more stages, where the gaseous components separated off in a first stage at an absolute pressure of from 15 MPa to 50 MPa are recycled to the one or more compressors via a high-pressure gas recycle line and the gaseous components separated off in a second stage at an absolute pressure in the range of from 0.1 MPa to 0.5 MPa are recycled to the first stage of the sequence of compression stages via a low-pressure gas recycle line, and the polymeric components obtained by the polymerization are transformed into pellets.

The high-pressure polymerization is preferably a homopolymerization of ethylene or a copolymerization of ethylene with one or more other monomers, provided that these monomers are free-radically copolymerizable with ethylene under high pressure. Examples of copolymerizable monomers for use in the present technology are $\alpha,\beta$-unsaturated $C_3$-$C_8$-carboxylic acids, derivatives of $\alpha,\beta$-unsaturated $C_3$-$C_8$-carboxylic acids, e.g. unsaturated $C_3$-$C_{15}$-carboxylic esters or anhydrides, and 1-olefins. In addition, vinyl carboxylates, such as vinyl acetate, can be used as comonomers. Propene, 1-butene, 1-hexene, acrylic acid, n-butyl acrylate, tert-butyl acrylate, 2-ethylhexyl acrylate, vinyl acetate or vinyl propionate are particularly suitable as comonomer.

In the case of copolymerization, the proportion of comonomer or comonomers in the reaction mixture is from 1 to 50% by weight, preferably from 3 to 40% by weight, based on the amounts of monomers, i.e. the sum of ethylene and other monomers. Depending on the type of comonomer, it can be preferred to feed the comonomers at more than one point to the reactor set-up. Preferably the comonomers are fed to the suction side of the secondary compressor.

For the purposes of the present disclosure, polymers or polymeric materials are substances which are made up of at least two monomer units. The polymers or polymeric materials are preferably low density polyethylenes having an average molecular weight $M_n$ of more than 20 000 g/mole. The term "low density polyethylene" (LDPE) includes ethylene homopolymers and ethylene copolymers. The process can also be the preparation of oligomers, waxes and polymers having a molecular weight $M_n$ of less than 20 000 g/mole.

The polymerization is preferably a radical polymerization carried out in the presence of free-radical polymerization initiators. Possible initiators for starting the polymerization in the respective reaction zones are in general any substances that can produce radical species under the conditions in the polymerization reactor, for example, oxygen, air, azo compounds or peroxidic polymerization initiators. In a preferred embodiment of the disclosure, the polymerization is carried out by using oxygen, either fed in the form of pure $O_2$ or as air. In case of initiating the polymerization with oxygen, the initiator is normally first mixed with the ethylene feed and then fed to the reactor. In such a case, it is not only possible to feed a stream comprising monomer and oxygen to the beginning of the polymerization reactor but also to one or more points along the reactor creating two or more reaction zones. Initiation using organic peroxides or azo compounds also represents a preferred embodiment of the present disclosure. It is possible to use either individual initiators or preferably mixtures of various initiators. A large range of initiators, in particular peroxides, are commercially available, for example the products of Akzo Nobel offered under the trade names Trigonox® or Perkadox®.

In the high-pressure polymerization, the molecular weight of the polymers to be prepared can as usual be altered by the addition of modifiers which act as chain-transfer agents. Examples of modifiers for use in the present technology are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde or 1-olefins such as propene, 1-butene or 1-hexene, or aliphatic hydrocarbons such as propane.

Appropriate tubular reactors are basically long, thick-walled pipes, which are usually from about 0.5 km to 4 km, preferably from 1 km to 3 km and especially from 1.5 km to 2.5 km long. The inner diameter of the pipes is usually in the range of from about 30 mm to 120 mm and preferably from 60 mm to 100 mm. Such tubular reactors have preferably a length-to-diameter ratio of greater than 1000, preferably from 10000 to 40000 and especially from 25000 to 35000. When feeding not all of the compressed reaction fluid to the inlet of the tubular reactor but feeding a part of the compressed reaction fluid as one or more side streams to the tubular reactor downstream of the inlet of the tubular reactor, the tubular reactor has preferably not a constant diameter over the full length but the diameter of the reactor increase downstream of each injection point for a reaction fluid stream.

Preferably, the tubular reactor is composed of individual segments. These segments or tubings are preferably flanged together. The tubings can be straight tubes or the tubings can be bends. Preferably, the straight tubes have a length of from 15 m to 20 m. The tubes can be flanged to other tubes, or the tubes can be flanged to a bend. Preferred bends are 180° bend bends, i.e. bends which are shaped in a semicircle. It is also possible that the bends are formed in a way that more than one bend flanged together, for example two bends flanged together, form a semicircle. The bends have preferably a small radius; i.e. preferably the centerline radius of the bends is not more than the tenfold of the average inside diameter of the bends, more preferably the centerline radius of the bends is not more than the eightfold of the average inside diameter of the bends, and in particular the centerline radius of the bends is not more than the fivefold of the average inside diameter of the bends.

In a preferred embodiment of the present disclosure, the flanges are arranged such that groups of flanges are aligned on top of each other. Preferably such a group of flanges is arranged one atop of the other and has at least two flanges, more preferably from 3 to 100 flanges, and most preferably from 5 to 60 flanges.

Preferred tubular reactors have at least two reaction zones, preferably from 2 to 6 reaction zones and more preferably from 2 to 5 reaction zones. The number of reaction zones is given by the number of feeding points for the initiator. Such a feeding point can, for example, be a feeding point for a solution of azo compounds or organic peroxides. Fresh initiator is added to the reactor, where the initiator decomposes into free radicals and initiates further polymerization. The generated heat of the reaction raises the temperature of the reaction mixture, since more heat is generated than can be removed through the walls of the tubular reactor. The rising temperature increases the rate of decomposition of the free-radical initiators and accelerates polymerization until essentially all of the free-radical initiator is consumed. Thereafter, no further heat is generated, and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises and accordingly allows for adjusting that value. Normally, the temperature rise is set to be in the range of from 70° C. to 170° C. in the first reaction zone and 50° C. to 130° C. for the subsequent reaction zones depending on the product specifications and the reactor configuration. Preferably, the tubular reactor is equipped with cooling jackets for removing the heat of the reaction. More preferably, all reaction zones of the tubular reactor are cooled by cooling jackets.

In a preferred embodiment of the present disclosure, the cooling jackets are arranged on straight tubes. Preferably, each of the straight tubes is equipped with a cooling jacket. Preferably, water is used as a cooling medium. In a preferred embodiment, not each of the straight tubes is supplied individually with the cooling medium but some adjacent straight tubes form a group, for example a group of two, three, four, five or six straight tubes, and this group of straight tubes is supplied with the cooling medium. The cooling medium is then conveyed to the cooling jacket of one of the straight tubes of the group and thereafter passed through the cooling jackets of the other members of the group of straight tubes before being taken away from the tubular reactor.

The compression of the reaction fluid to the elevated pressure, at which the polymerization is carried out, preferably occurs by one or more compressors in a sequence of compression stages, where preferably a primary compressor first compresses the reaction fluid to a pressure of from 10 MPa to 50 MPa and a secondary compressor, which is sometimes designated as a hyper compressor, further compresses the reaction fluid to the polymerization pressure of from 110 MPa to 500 MPa. Preferably the primary compressor and the secondary compressor are multistage compressors. It is further possible to separate one or more stages of one or both of these compressors and divide the stages into separated compressors. However, usually a series of one primary compressor and one secondary compressor is used for compressing the reaction fluid to the polymerization pressure. In such cases, sometimes the whole primary compressor is designated as primary compressor. However, it is also common to designate the one or more first stages of the primary compressor, which compress the recycle gas from the low-pressure product separator to the pressure of the fresh ethylene feed, as the booster compressor and then only the one or more subsequent stages as the primary compressor, although the booster compressor and the subsequent stages are all part of one apparatus. Due to the technical concept of reciprocating compressors, common secondary compressors do not provide an absolutely constant pressure, but the pressure level is oscillating as a result of the pulsating flow.

In the process of the present disclosure, the facility comprises a preheater upstream of the tubular reactor for heating the reaction fluid to a temperature capable of initiating the polymerization, the preheater having an inlet into which the reaction fluid is introduced for being heated and an outlet through which the heated reaction fluid leaves the preheater. Preferably, the preheater is a long, thick-walled pipe having an inner diameter from 30 mm to 140 mm and preferably from 60 mm to 120 mm. The preheater is preferably composed of individual segments. These segments or tubings are preferably flanged together. The preheating tubings can be straight tubes or the tubings can be bends. Preferably, the straight tubes have a length of from 15 m to 20 m. The tubes can be flanged to other tubes, or the tubes can be flanged to a bend. Preferred bends are 180° bend bends, i.e. bends which are shaped in a semicircle. It is also possible that the bends are formed in a way that more than one bend is flanged together, for example two bends flanged together, to form a semicircle. The bends have preferably a small radius; i.e. preferably the centerline radius of the bends is not more than the tenfold of the average inside diameter of the bends, more preferably the centerline radius of the bends is not more than the eightfold of the average inside diameter of the bends, and in particular the centerline radius of the bends is not more than the fivefold of the average inside diameter of the bends. In preferred embodiment of the present disclosure, the flanges are arranged such that groups of flanges are aligned on top of each other. Preferably such a group of flanges is arranged one atop of the other and has at least two flanges, more preferably from 3 to 50 flanges, and most preferably from 5 to 30 flanges.

In a preferred embodiment of the present disclosure, the entire reaction fluid provided by the secondary compressor is fed via the preheater to the inlet of the tubular reactor. In another preferred embodiment of the present disclosure only a part of the reaction fluid compressed by the secondary compressor is fed via the preheater to the inlet of the tubular reactor and the remainder of the reaction fluid compressed by the secondary compressor is fed as one or more side streams to the tubular reactor downstream of the inlet of the tubular reactor. In such a set-up, preferably from 30 to 90% by weight, more preferably from 40 to 70% by weight of the reaction fluid provided by the secondary compressor are fed to the inlet of the tubular reactor and from 10 to 70% by weight, more preferably from 30 to 60% by weight of the reaction fluid provided by the secondary compressor are fed as one or more side streams to the tubular reactor downstream of the inlet of the tubular reactor.

The facility for carrying out the polymerization of the present disclosure comprises, beside the polymerization reactor, two or more gas recycle lines for recycling unreacted monomers into the polymerization process. The reaction mixture obtained in the polymerization reactor is transferred to a first separation vessel, frequently called high-pressure product separator, and separated into a gaseous fraction and a liquid fraction at an absolute pressure of from 15 MPa to 50 MPa. The gaseous fraction withdrawn from the first separation vessel is fed via a high-pressure gas recycle line to the suction side of the secondary compressor. In the high-pressure gas recycle line, the gas is usually purified by several purification steps for removing undesired components such as entrained polymer or oligomers. The liquid fraction withdrawn from the first separation vessel, which usually still comprises dissolved monomers such as ethylene and comonomers in an amount of 20 to 40% of weight, is transferred to a second separation vessel, frequently called a low-pressure product separator, and further separated, at reduced pressure, usually at an absolute pressure in the range of from 0.1 MPa to 0.5 MPa, in polymeric and gaseous components. The gaseous fraction withdrawn from the second separation vessel is fed via a so-called low-pressure gas recycle line to the primary compressor, preferably to the foremost of the stages. Also, the low-pressure gas recycle line usually comprises several purification steps for purifying the gas from undesired components. The facility can further comprise additional separation steps for separating additional gaseous fractions from the reaction mixtures and additional gas recycle lines for feeding such additional gaseous fractions comprising not reacted monomers to one of the compressors, for example in-between the first separation step and the second separation step operating at an intermediate pressure.

Preferably, the recycled gas coming from the low-pressure gas recycle line is compressed by the first stages of the primary compressor to the pressure of the fresh feed of ethylenically unsaturated monomers, preferably ethylene, and thereafter combined with the fresh gas feed and the combined gases are further compressed in the primary compressor to the pressure of from 10 MPa to 50 MPa. Preferably the primary compressor comprises five or six compression stages, two or three before adding the fresh gas and two or three after adding the fresh gas. The secondary compressor has preferably two stages; a first stage, which compresses the gas from about 30 MPa to about 120 MPa, and a second stage, which further compresses the gas from about 120 MPa to the final polymerization pressure.

The pressure within the polymerization reactor is preferably controlled by a pressure control valve, which is arranged at the outlet of the polymerization reactor and through which the reaction mixture leaves the reactor. The pressure control valve can be any valve arrangement which is suitable for reducing the pressure of the reaction mixture leaving the reactor to the pressure within the first separation vessel.

In a preferred embodiment of the present disclosure, the facility comprises a post reactor cooler downstream of the polymerization reactor for cooling the reaction mixture. The post reactor cooler can be arranged upstream of the pressure control valve or the post reactor cooler can be arranged downstream of the pressure control valve. Preferably, the post reactor cooler is arranged downstream of the pressure control valve. Preferably, the post reactor cooler is a long, thick-walled pipe having an inner diameter from 30 mm to 120 mm and preferably from 60 mm to 100 mm. The post reactor cooler is preferably composed of individual segments. These segments or cooling tubings are preferably flanged together. The cooling tubings can be straight tubes or the tubings can be bends. Preferably, the straight tubes have a length of from 15 m to 20 m. The tubes can be flanged to other tubes, or the tubes can be flanged to a bend. Preferred bends are 180° bends, i.e. bends which are shaped in a semicircle. It is also possible that the bends are formed in a way that more than one bend flanged together, for example two bends flanged together, form a semicircle. The bends have preferably a small radius; i.e. preferably the centerline radius of the bends is not more than the tenfold of the average inside diameter of the bends, more preferably the centerline radius of the bends is not more than the eightfold of the average inside diameter of the bends, and in particular the centerline radius of the bends is not more than the fivefold of the average inside diameter of the bends. In preferred embodiment of the present disclosure, the flanges are arranged such that groups of flanges are aligned on top of each other. Preferably such a group of flanges is arranged one atop of the other and has at least two flanges, more preferably from 3 to 80 flanges, and most preferably from 5 to 60 flanges.

Preferred tubular reactors are located in a chamber having a surrounding protective wall.

The polymeric components obtained by the polymerization are finally transformed into pellets, normally by apparatuses like extruders or granulators.

Figure 1:
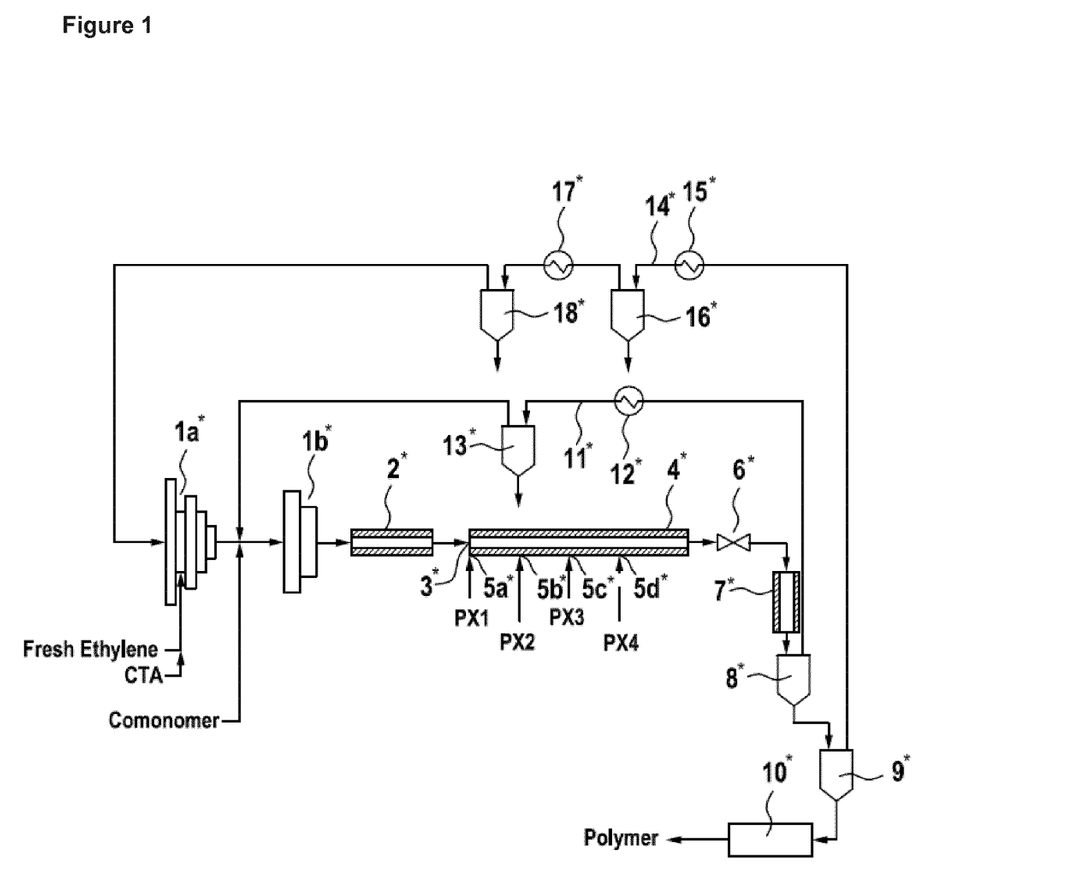
FIG. 1 shows schematically a set-up of a facility for carrying out a high-pressure polymerization according to the present disclosure.

FIG. 1 shows schematically a set-up of a facility for high-pressure ethylene polymerization comprising a tubular reactor which is continuously operated.

The fresh ethylene, which is usually under a pressure of 1.7 MPa, is firstly compressed to a pressure of about 30 MPa by means of a primary compressor (1a*) and then compressed to the reaction pressure of about 300 MPa using a secondary compressor (1b*). Chain transfer agents (CTA) may be added to the primary compressor (1a*) together with the fresh ethylene. Comonomer may be added upstream of the secondary compressor (1b*). The reaction mixture leaving the secondary compressor (1b*) is fed to a preheater (2*), where the reaction mixture is preheated to the reaction start temperature of from about 120° C. to 220° C., and then conveyed to the inlet (3*) of the tubular reactor (4*).

The tubular reactor (4*) is basically a long, thick-walled pipe with cooling jackets to remove the liberated heat of reaction from the reaction mixture by means of a coolant circuit (not shown).

The tubular reactor (4*) shown in FIG. 1 has four spatially separated initiator feeding points (5a*), (5b*), (5c*) and (5d*) for feeding initiators or initiator mixtures PX1, PX2, PX3 and PX4 to the reactor and accordingly also four reaction zones. By feeding suitable free-radical initiators, which decompose at the temperature of the reaction mixture, to the tubular reactor the polymerization reaction starts.

The reaction mixture leaves the tubular reactor (4*) through a pressure control valve (6*) and passes a post reactor cooler (7*). Thereafter, the resulting polymer is separated off from unreacted ethylene and other low molecular weight compounds (monomers, oligomers, polymers, additives, solvent, etc.) by means of a first separation vessel (8*) and a second separation vessel (9*), discharged and pelletized via an extruder and granulator (10*).

The ethylene and comonomers which have been separated off in the first separation vessel (8*) are fed back to the inlet end of the tubular reactor (4*) in the high-pressure circuit (11*) at 30 MPa. In the high-pressure circuit (11*), the gaseous material separated from the reaction mixture is first freed from other constituents in at least one purification stage and then added to the monomer stream between primary compressor (1a*) and secondary compressor (1b*). FIG. 1 shows one purification stage consisting of a heat exchanger (12*) and a separator (13*). It is however also possible to use a plurality of purification stages. The high-pressure circuit (11*) usually separates waxes.

The ethylene which has been separated off in the second separation vessel (9*), which further comprises, inter alia, the major part of the low molecular weight products of the polymerization (oligomers) and the solvent, is worked up in the low-pressure circuit (14*) at an absolute pressure of from about 0.1 MPa to 0.5 MPa in a plurality of separators with a heat exchanger being installed between each of the separators. FIG. 1 shows two purification stages consisting of heat exchangers (15*) and (17*) and separators (16*) and (18*). It is however also possible to use only one purification stages or preferably more than two purification stages. The low-pressure circuit (14*) usually separates oil and waxes.

In the process for the preparation of ethylene homopolymers or copolymers of the present disclosure, the process comprises the following steps:
a) compressing the reaction fluid comprising or consisting of ethylene, in particular an ethylene gas, to an elevated pressure;
b) heating at least a portion of the reaction fluid in the preheater;
c) introducing the reaction fluid heated in step b) into the reactor at the reactor inlet; and
d) polymerizing the reaction fluid at the elevated pressure in the presence of free-radical polymerization initiators in the reactor, wherein the average velocity of the reaction fluid at the outlet of the preheater is lower than the average velocity of the reaction fluid in the tubular reactor at the reactor inlet and the ratio of the average velocity of the reaction fluid in the tubular reactor at the reactor inlet to the average velocity of the reaction fluid in the preheater at the outlet of the preheater is in the range from 1.5 to 5, preferably in the range from 1.7 to 2, and more preferably in the range from 1.8 to 2.2. Operating the preheater with an accordingly lower average velocity of the reaction fluid in the preheater than in the tubular reactor ensures a low pressure drop over the preheater resulting allowing an increased conversion rate and a reduced pressure pulsation level within the tubular reactor. The process in accordance with the present disclosure is more stable and the resulting polymers have a continuously high quality, in particular a consistent quality that ensures a problem-free further processing.

In the context of the present disclosure, the average velocity of the reaction fluid at a specific position of the tube can be calculated from the average mass flow through the cross-sectional area at the specific position of the tube in consideration of the reaction fluid density at the given pressure and temperature. The average velocity of the reaction fluid is accordingly a mean over variations in the mass flow, for example caused by pressure fluctuations induced by the secondary compressor, and a mean over the velocity profile which forms across the diameter of the tube when a fluid flows through a tube.

In some embodiments, in step a), a piston compressor is used for compressing of the reaction fluid. Preferably, the compression is affected by one or more multiple-stage, in particular two-stage, piston compressors. Preferably, said piston compressor is a compressor that is a high-pressure reciprocating compressor and/or may achieve a pressure of at least 180 MPa, in particular at least 250 MPa.

Preferably, in step a), the pressure of the reaction fluid after compression ranges from 180 MPa to 320 MPa. Preferably, in step c), when introducing the heated reaction fluid into the reactor, the pressure of the reaction fluid ranges from 175 MPa to 315 MPa. Preferably, the pressure in step a) is higher than the pressure in step c). In some embodiments, the pressure in step a) is not more than 10%, preferably 5%, in particular 2%, higher than the pressure in step c) when introducing the heated reaction fluid into the reactor. Preferably, the pressure in step a) is higher than the pressure in step c) by an absolute pressure difference of from 0.1 to 20 MPa, in particular from 0.5 to 10 MPa, preferably from 1 to 6 MPa. Preferably, said absolute pressure difference is less than 5 MPa.

In some embodiments, in step c), when introducing the heated reaction fluid into the reactor, the temperature of the reaction fluid ranges from 140° C. to 170° C.

In a preferred embodiment of the present disclosure, the preheater consists of two preheater units and a first preheater unit is arranged on a first branch line and a second preheater unit is arranged on a second branch line, wherein the first and second preheater units are installed in parallel. In such an embodiment, the two preheater units are preferably pipes having an identical diameter and the two preheater units are more preferably pipes having the same diameter as the tubular reactor.

In this embodiment of two parallel two preheater units with a first preheater unit being arranged on a first branch line and a second preheater unit being arranged on a second branch line, the process for the preparation of ethylene homopolymers or copolymers preferably comprises the following steps:

a') providing a first flow of compressed reaction fluid comprising a first portion of the reaction fluid and providing a second flow of compressed reaction fluid comprising a second portion of the reaction fluid by, in any order, compressing the reaction fluid to an elevated pressure and splitting at least a portion of a single flow of the reaction fluid into the first flow and the second flow of compressed reaction fluid;

b') conducting the first flow of the first portion of the reaction fluid through the first preheater unit and heating the first portion of the reaction fluid in the first preheater unit, and conducting the second flow of the second portion of the reaction fluid through the second preheater unit and heating the second portion of the reaction fluid in the second preheater unit;

c') combining the first and second portion of the reaction fluid by recombining the first flow and the second flow of the reaction fluid and introducing the recombined flow of the reaction fluid heated in step b') into the reactor at the reactor inlet; and d') polymerizing the reaction fluid at the elevated pressure in the presence of free-radical polymerization initiators in the reactor, It was found that splitting after compression can be advantageous as pressure pulsations are reduced compared to a setup wherein the compression is done after splitting. Accordingly, in a preferred embodiment, in step a'), a single flow of the reaction fluid is compressed to an elevated pressure and thereafter at least a portion of the flow is split at a junction appliance, into the first flow comprising the first portion of the reaction fluid and into the second flow comprising the second portion of the reaction fluid. However, in some embodiments in step a') a single flow of the reaction fluid comprising or consisting of ethylene is split at a junction appliance into a first flow comprising the first portion of the reaction fluid and into a second flow comprising the second portion of the reaction fluid and thereafter the first portion of the reaction fluid and second portion of the reaction fluid are compressed using two compressors, and in step b') the first flow is conducted through the first preheater unit and the second flow is conducted through the second preheater unit, and in step c') said flows are recombined.

Preferably, said recombination is achieved in a merging appliance, preferably a T-piece, wherein a single line leads to the reactor.

In some embodiments, the first preheater unit has first heating elements and the second preheater unit has second heating elements that are arranged at intervals and spaced apart from each other. Said heating elements may be connected by heating pipelines or the heating elements may be not connected by heating pipelines. It should be understood that heating elements that are connected by heating pipelines form a subset of connected heating elements. A heating pipeline is a channel that transports a heating fluid in order to heat the heating elements. It is not identical with the first and second branch line for the reaction fluid. It should further be understood that a heating pipeline does not carry reaction fluid. It carries a heating fluid having a different composition than the reaction fluid, e.g. liquid water or steam, which is used for heating of the branch lines, e.g. by flowing through heating elements arranged around the branch line(s), in particular around the first or second branch line. Preferably, the heating fluid is steam, in particular saturated steam.

Preferably, the first and second heating elements are heated using a heating fluid, wherein some or all of the first heating elements are connected by heating pipelines to each other and some or all of the second heating elements are connected by heating pipelines to each other. In some particular preferred embodiments, the first and second preheater units each have at least two, in particular three to six, subsets of heating elements, wherein the heating elements within each of said subset are connected by heating pipelines, wherein said subsets are not connected by heating pipelines to each other.

Preferably, the first heating elements have at least two, in particular three to six, subsets of first heating elements, wherein the first heating elements within each subset are connected by heating pipelines and wherein said subsets are not connected to each other by heating pipelines, wherein different heating fluids are used for heating each subset of first heating elements, wherein the second heating elements have at least two, in particular three to six, subsets of second heating elements, wherein the second heating elements within each subset are connected by heating pipelines and wherein said subsets are not connected to each other by heating pipelines, wherein different heating fluids are used for heating each subset of second heating elements, wherein the different heating fluids differ in pressure, composition, source of the heating fluid and/or temperature within the subset of first heating elements and within the subset of second heating elements. Preferably, the subsets of the first and second heating elements make use of identical different fluids, e.g. the same selection of different fluids that is used for the subsets of first heating elements is also used for the subsets of second heating elements.

A "different" heating fluid within the present disclosure means that at least one property of said heating fluid is different. This may be the composition, the temperature and/or the pressure. In some embodiments, different heating fluids having the same composition may differ in pressure and temperature, in particular when low pressure liquid water or steam is used for a first subset of first heating elements, warmer medium pressure liquid water or steam is used for another subset of first heating elements and even warmer high pressure steam is used for a another subset of first heating elements, and when low pressure liquid water or steam is used for a first subset of second heating elements, warmer medium pressure liquid water or steam is used for another subset of second heating elements and even warmer high pressure steam is used for another subset of second heating elements. In this case, there are three different subsets of first heating elements having three different fluids, wherein the fluids are different in temperature and pressure within the subset as well as three different subsets of second heating elements having three different fluids, wherein the fluids are different in temperature and pressure within the subset. Pressure and temperature of the heating fluids increase as the reaction fluid travels towards the reaction chamber. It was found that this leads to a controlled warming of the reaction fluid.

In some embodiments, the above mentioned low pressure liquid water or steam preferably has a temperature in the range from 60 to 160° C., in particular from 80 to 120° C., the medium pressure liquid water or steam preferably has a temperature in the range from 100 to 200° C., in particular from 120 to 180° C., and/or the high-pressure steam preferably has a temperature in the range from 160 to 300° C., in particular 180 to 240° C.

In some embodiments, at least two subsets of first heating elements are heated with identical fluids, wherein the first heating elements within each subset are connected by heating pipelines and wherein said subsets are not connected to each other by heating pipelines, are made use of and at least two subsets of second heating elements are heated with identical fluids, wherein the second heating elements within each subset are connected by heating pipelines and wherein said subsets are not connected to each other by heating pipelines, are made use of. Preferably, said subsets of first and second heating elements with identical fluids are used in addition to the above described subsets with different fluids. It was found that the cooling of the heating fluid within the heating pipelines can be controlled better if non-connected subsets of first heating elements with identical fluids and non-connected subsets of second heating elements with identical fluids are made use of, i.e. the same heating fluid is introduced twice into the system, but afterwards subsets with different heating fluids are often made use of in other subsets of heating elements.

Preferably, the amount of heating elements arranged in or around the first and second branch line is the same and/or the length of the first and second branch line is the same.

In some embodiments, the first and second branch lines are meandering lines each having at least three bends, preferably from four to ten bends, and in particular from five to eight bends. It was found to be useful when in some embodiments the first and second branch lines have straight sections that are partially or fully insulated using insulation elements, wherein the bends are not insulated with said insulation elements.

Figure 2:
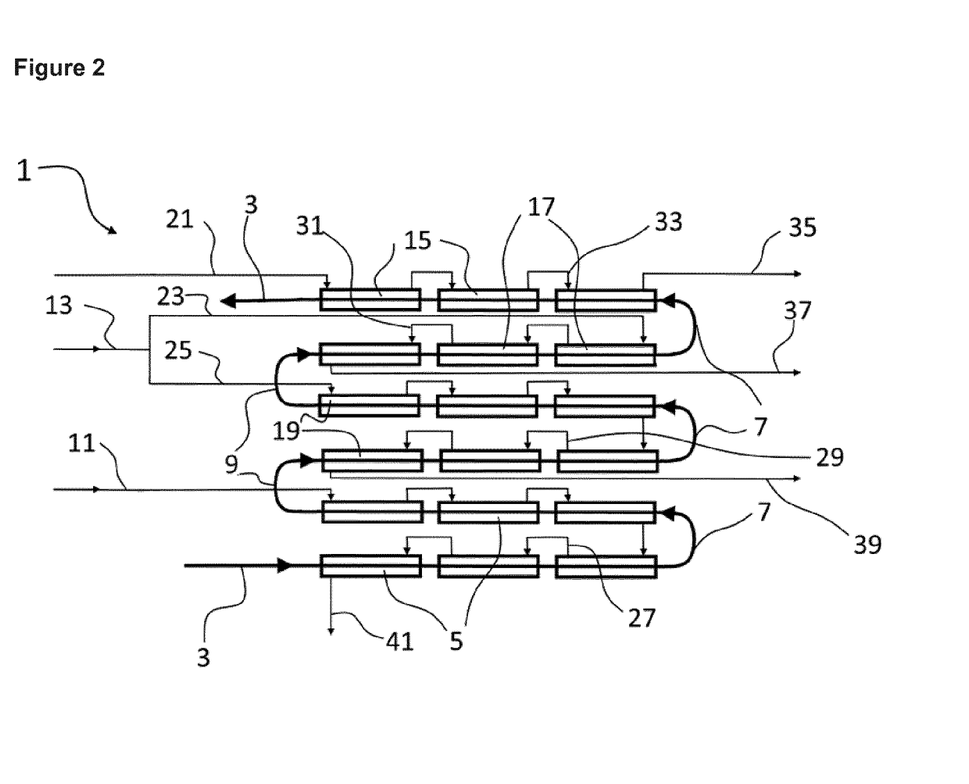
FIG. 2 shows schematically an embodiment of a preheater unit according to the present disclosure.

FIG. 2 shows a schematic view of a preheater unit (1) in accordance with an embodiment of the present disclosure. The preheater unit (1) shown in FIG. 2 may be a first or a second preheater unit as said preheaters element are usually built similarly or identically. However, for the sake of simplicity hereinafter, the preheater unit of FIG. 2 is discussed assuming that it is a first preheater unit.

The first preheater unit of FIG. 2 has a first branch line (3). It is a meandering branch line having five bends (7, 9), wherein three bends (7) are opposing another two bends (9) in such a way that the branch line (3) leaves in the same direction as it entered. FIG. 2 shows a multitude of first heating elements (5, 15, 17, 19) that are arranged around the first branch line. Said heating elements (5, 15, 17, 19) are arranged into different subsets, wherein within each subset the heating elements (5, 15, 17, 19) are connected by heating pipelines (27, 29, 31, 33). Said subsets shall be discussed in detail hereinafter.

In the beginning, i.e. at the point where the reaction fluid enters the preheater unit as indicated by the arrows along the first branch line, a first subset of six first heating elements (5) is shown that are connected by heating pipelines (27). A low-pressure heating fluid (11) is introduced, guided though said subset of six first heating elements (5) using heating lines (27) and leaves the preheater unit at an exit port (41).

After the first subset of six first heating elements (5), another subset of six first heating elements (19) is shown that are connected by heating pipelines (29). In this case, a medium pressure heating fluid (25) is introduced, guided though said subset of six first heating elements (19) using heating lines (29) and leaves the preheater unit at an exit port (39).

After the second subset of six first heating elements (19), a subset of three first heating elements (17) is shown that are connected by heating pipelines (31). A medium pressure heating fluid (23) is introduced, guided though said subset of three first heating elements (17) using heating lines (31) and leaves the preheater unit at an exit port (37).

After said subset of three first heating elements (17), another subset of three first heating elements (15) is shown that are connected by heating pipelines (33). A high-pressure heating fluid (21) is introduced, guided though said subset of three heating elements (15) using heating lines (33) and leaves the preheater unit at an exit port (35).

In the present embodiment, the medium pressure fluids (23, 25) for the heating elements (17) and (19) comes from the same source (13). The high-pressure fluid (21) comes from a different source. As described above, the pressure and temperature is increased slowly though the first branch line in such a way that a controlled heating of the reaction fluid is achieved.

Figure 3:
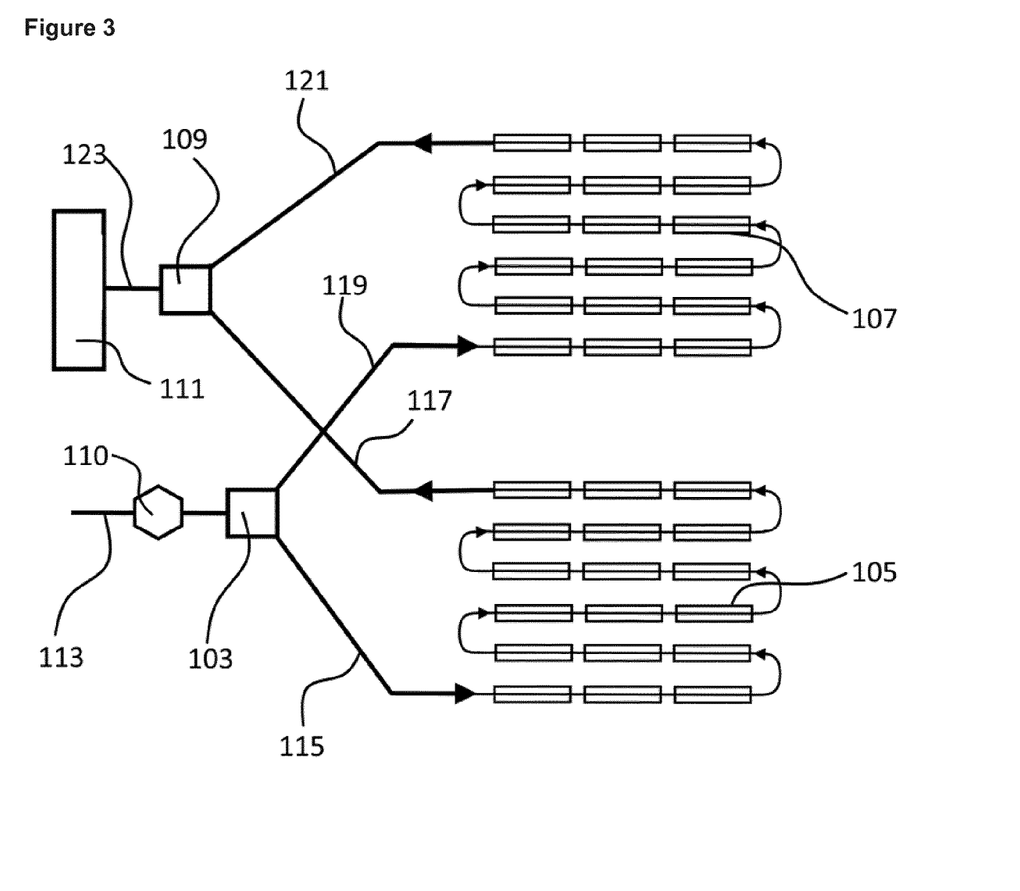
FIG. 3 shows schematically an embodiment of an arrangement of a first and a second preheater unit in connection with a tubular reactor.

FIG. 3 shows another embodiment in accordance with the present disclosure. First and second preheater units (105, 107) are shown that are in accordance with FIG. 2, wherein the depiction of heating pipelines is omitted for the sake of clarity. It should be understood that although the preheater units of FIG. 2 are shown, any preheater unit that are arranged in parallel may be made use of. The facility of FIG. 3 comprises a first preheater unit (105) arranged on a first branch line (115, 117) and a second preheater unit (107) arranged on a second branch line (119, 121), wherein the first and second preheater units (105, 107) are installed in parallel, the facility further comprising a reactor having a reaction chamber (111). The gas is compressed using a compressor (110) and the main line (113) is divided at a junction (103) into a first branch line (115) leading into the first preheater unit (105) and a second branch line (119) leading into the second per-heater (107). The first and second brunch lines (117, 121) exit the preheater units afterwards and are combined in a merging appliance (109) before the main line (123) leads into the reaction chamber (111) of the reactor.

The embodiment shows in FIG. 3 relates to a facility for the preparation of ethylene polymers in which two preheater units (105, 107) are arranged in parallel.

EXAMPLES

Density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The melt flow rate MFR was determined according to DIN EN ISO 1133:2005, condition Data temperature of 190° C. under a load of 2.16 kg.

Haze was determined according to ASTM D 1003-00 using 50 µm thickness blown film extruded at a melt temperature of 180° C. and a blow-up ratio of 2:1.

Gloss was determined at 60° according to ASTM D 2457-03 using 50 µm thickness blown film extruded at a melt temperature of 180° C. and a blow-up ratio of 2:1.

The gel count was determined by preparing a cast film, analyzing the film defects by means of an optical scanning device and classifying and counting the film defects according to their size (circle diameter). The films were prepared by an extruder (type ME20) equipped with a chill roll and winder, model CR-9, and analyzed by an optical film surface analyzer with flash camera system, model FTA100 (all components produced by OCS Optical Control Systems GmbH, Witten, Germany). The apparatus had the following characteristics
  screw diameter: 20 mm;
  screw length: 25 D;
  compression ratio: 3:1;
  screw layout 25 D: 10 D feeding, 3 D compression, 12 D metering;
  dimensions: 1360×650×1778 mm³ (L×W×H; without die);
  die width (slit die): 150 mm;
  resolution: 26 µm×26 µm;
and was operated under the following conditions
  T 1 230° C.;
  T 2 230° C.;
  T 3 230° C.;
  T 4 (adapter) 230° C.;
  T 5 (die) 230° C.;
  die slit die 150 mm;
  take off speed 3.0 m/min;
  screw speed to be adjusted to film thickness 50 µm;
  throughput 1.0 to 1.5 kg/h (target 1.15 kg/h);
  air shower on −5 m³/h,
  chill roll temperature 50° C.;
  vab chill roll 4 N;
  winding tensile force 4 N,
  draw off strength 5 N;
  camera threshold threshold 1: 75%-threshold 2: 65%.

For starting the measurement, extruder and take off unit were set to the specified conditions and started with a material having a known gel level. The film inspection software was started when the extruder showed steady conditions of temperature and melt pressure. After having operated the extruder with the starting material for at least half an hour or after the gel count having reached the known gel level, the first sample to measure was fed to the extruder. After having reached a stable gel level for 45 minutes the counting process was started until the camera had inspected an area of at least 3 m² of film. Thereafter the next sample was fed to the extruder and after having reached again a stable gel count for 45 minutes the counting process for the next sample was started. The counting process was set for all samples in a way that the camera inspected an area of at least 3 m² of film and the number of measured defects per size-class was normalized to 1 m² of film.

The draw down thickness was determined by preparing a blown film with slowly increasing take-off speed until the film had broken. The film thickness at "break point" is reported as draw down thickness. The films were prepared by a film blowing line having the following characteristics
  single screw extruder with grooved feed section: 50 mm×30D
  barrier screw with mixing elements at the screw tip
  spiral mandrel die: 120 mm×1 mm
  extruder temperature: MFR 3-0.7: 180° C.
  throughput: 35 kg/hr
  film blow up ratio: 2.5
  single lip cooling ring (suitable for blow up ratios from 2:1 to 4:1)
  no internal bubble cooling system
  height adjustable calibrating basket with Teflon® rolls
  lay flat unit equipped with rolls (CFRP guide rolls, V-shape side positioning guidance by CFRP rolls; CFRP=Carbon Fiber Reinforced Plastic)

For determining the draw down thickness, the film preparation was started with a take-off speed of 3 m/min. Without changing processing conditions such as frost line, blow up ratio, and film width, the take-off speed was increased by a rate of 2 m/min every 20 seconds until the film broke or showed formation of holes. The draw down thickness was measured at a distance of 70 cm prior to the location of the film break or hole formation. A multitude of measurements was made circumferentially in distances of 3 to 4 cm and the average of these measurements was reported as draw down thickness.

Example 1

A LDPE film grade was produced by continuous polymerization of ethylene as ethylenically unsaturated monomer in a high-pressure tubular reactor of the design shown in FIG. 1 having in total a length of 2140 m and a design pressure of 300 MPa. The tubular reactor was composed of reactor tubes having a length of 17 m with an outer diameter $d_o$ of 137 mm and an inner diameter $d_i$ of 75 mm. Propionaldehyde was added as chain transfer agent to the fresh ethylene stream entering the primary compressor (1a) in an amount of 1.4 kg per t of produced polyethylene.

The secondary compressor (1b) was operated with a throughput of 125 t reaction fluid per hour. The reaction fluid was compressed to 270 MPa which was the maximum achievable before the safety reactor elements were responding. The pressure was adjusted by varying the opening periods of the pressure control valve. The reaction fluid was heated to 160° C. in a combination of two preheater units which were arranged in parallel. Both preheater units were constructed with tubes having a length of 17 m, an outer diameter $d_o$ of 137 mm and an inner diameter $d_i$ of 75 mm and had a length of 289 meters. The combined heat transfer area of the preheater units was 136 m². After having passed the preheater units, the fluid streams had a pressure of 265 MPa. The average velocity of the reaction fluid in the preheater units at their outlets was 7.85 m/s.

The two reaction fluid streams were combined after having passed the preheater units and were fed to the reactor inlet. The average velocity of the reaction fluid in the tubular reactor at the reactor inlet was 15.7 m/s. The peroxidic polymerization initiators were metered into the tubular reactor at four positions using isododecane as additional diluent. For removing the generated heat of polymerization, cooling water was circulated through cooling the jackets attached to the outer surface of the reactor tubes. The reaction mixture discharged from the tubular reactor (4) was passed through a post reactor cooler (7) and separated from volatiles in two steps via a first separation vessel (8) and a second separation vessel (9). The degassed liquid polymer was conveyed to an extruder and granulator (10) to form LDPE pellets.

Within a period of 24 hours of continuous production, 1035 t of LDPE were obtained having the properties summarized in Table 1. Accordingly, the conversion rate of ethylene per pass through the reactor was 34.5%.

Example 2

The polymerization of Example 1 was repeated, however, instead of a combination of two preheater units, a single tubular preheater constructed with tubes having a length of 17 m, an outer diameter $d_o$ of 194 mm and an inner diameter $d_i$ of 106 mm was used to heat the reaction fluid stream to the temperature of 160° C. The preheater had a length of 408 meters and a heat transfer area of 136 m². The reaction fluid was compressed to 273 MPa which was the maximum achievable before the safety reactor elements were responding. After having passed the preheater, the reaction fluid stream was fed to the reactor inlet at a pressure of 260 MPa. The average velocity of the reaction fluid in the preheater at its outlet was 8.56 m/s and the average velocity of the reaction fluid in the tubular reactor at the reactor inlet was 15.9 m/s.

Within a period of 24 hours of continuous production, 1050 t of LDPE were obtained having the properties summarized in Table 1. Accordingly, the conversion rate of ethylene per pass through the reactor was 35%.

Comparative Example A

The polymerization of Example 1 was repeated, however, instead of operating the two preheater units in parallel, the two preheater units were arranged in serial mode resulting in a single tubular preheater having a length of 578 meters and a heat transfer area of 136 m² in order to heat the reaction fluid stream to the temperature of 160° C. Due to higher pressure pulsations at the discharge side of the secondary compressor compared to Example 1, the maximum discharge pressure was only 266.5 MPa. The lower compressor discharge pressure and the serial arrangement of the preheater resulted in a pressure of the reaction gas after having passed the preheater of 256.5 MPa. The average velocity of the reaction fluid in the preheater at its outlet was 16.2 m/s and the average velocity of the reaction fluid in the tubular reactor at the reactor inlet was 16.2 m/s.

Within a period of 24 hours of continuous production, 965 t of LDPE were obtained having the properties summarized in Table 1. Accordingly, the conversion rate of ethylene per pass through the reactor was 32.2%.

TABLE 1

|  | Example 1 | Example 2 | Comparative Example A |
|---|---|---|---|
| Density [g/cm³] | 0.9232 | 0.9234 | 0.9231 |
| MFR$_{2.16}$ [g/10 min] | 0.75 | 0.75 | 0.76 |
| Haze [%] | 6.5 | 6.4 | 7.4 |
| Gloss | 97 | 98 | 84 |
| Draw down thickness [µm] | 17 | 16 | 26 |
| Gel count |  |  |  |
| <200 µm [1/100 m²] | 365 | 350 | 542 |
| 200-400 µm [1/100 m²] | 75 | 70 | 119 |
| 400-800 µm [1/100 m²] | 6 | 5 | 11 |

The comparison of Example 2 and Comparative Examples A demonstrates that it is possible to prepare LDPE with a higher conversion of ethylene per pass of the reactor and better optical properties when using a preheater of a larger cross-section. However, as can be seen from a comparison of Example 1 and Comparative Examples A, it is not even needed to replace an existing tubular preheater by a preheater having a larger diameter, but sufficient to divide the preheater in two preheater units and to operate the two preheater units in parallel, in order to arrive at a higher conversion of ethylene per pass of the reactor and better optical properties of the prepared LDPE.

The invention claimed is:

1. A process for the preparation of ethylene homopolymers or copolymers in a facility having i) a high-pressure tubular reactor used in a continuous flow mode with a reaction fluid comprising ethylene being introduced into the reactor at a reactor inlet and polymer leaving the reactor at a reactor outlet and ii) a preheater having an inlet and an outlet, comprising the steps of:
   a) compressing the reaction fluid to an elevated pressure;
   b) heating at least a portion of the reaction fluid in the preheater;
   c) introducing the reaction fluid heated in step b) into the reactor at the reactor inlet; and
   d) polymerizing the reaction fluid at the elevated pressure in the presence of free-radical polymerization initiators in the reactor, thereby yielding a polymer selected from the group consisting of ethylene homopolymers and ethylene copolymers,
   wherein the average velocity of the reaction fluid at the outlet of the preheater is lower than the average velocity of the reaction fluid in the tubular reactor at the reactor inlet and the ratio of the average velocity of the reaction fluid in the tubular reactor at the reactor inlet to the average velocity of the reaction fluid in the preheater at the outlet of the preheater is in the range from 1.5 to 5.

2. The process of claim 1, wherein, in step a), a piston compressor is used for compressing of the reaction fluid.

3. The process of claim 1, wherein, in step a), the pressure of the reaction fluid after compression ranges from 180 MPa to 320 MPa, or, in step c), when introducing the heated reaction fluid into the reactor, the pressure of the reaction fluid ranges from 175 MPa to 315 MPa.

4. The process of claim 1, wherein, in step c), when introducing the heated reaction fluid into the reactor, the temperature of the reaction fluid ranges from 140° C. to 170° C.

5. The process of claim 1, wherein the preheater has two preheater units, wherein the first preheater unit is arranged on a first branch line and the second preheater unit is arranged on a second branch line.

6. The process of claim 5, further comprising the steps of:
a') providing a first flow of compressed reaction fluid comprising a first portion of the reaction fluid and providing a second flow of compressed reaction fluid comprising a second portion of the reaction fluid by, in any order, compressing the reaction fluid to an elevated pressure and splitting at least a portion of a single flow of the reaction fluid into the first flow and the second flow of compressed reaction fluid;
b') conducting the first flow of the first portion of the reaction fluid through the first preheater unit and heating the first portion of the reaction fluid in the first preheater unit, and conducting the second flow of the second portion of the reaction fluid through the second preheater unit and heating the second portion of the reaction fluid in the second preheater unit;
c') combining the first and second portion of the reaction fluid by recombining the first flow and the second flow of the reaction fluid and introducing the recombined flow of the reaction fluid heated in step b') into the reactor at the reactor inlet; and
d') polymerizing the reaction fluid at the elevated pressure in the presence of free-radical polymerization initiators in the reactor.

7. The process of claim 6, wherein, in step a'), a single flow of the reaction fluid is compressed to an elevated pressure and thereafter at least a portion of the flow is split at a junction appliance, into the first flow comprising the first portion of the reaction fluid and into the second flow comprising the second portion of the reaction fluid.

8. The process of claim 5, wherein the first preheater unit has first heating elements and the second preheater unit has second heating elements that are arranged at intervals and spaced apart from each other.

9. The process of claim 5, wherein the first and second heating elements are heated using a heating fluid, at least some of the first heating elements are connected by heating pipelines to each other, and at least some of the second heating elements are connected by heating pipelines to each other.

10. The process of claim 5, wherein the first heating elements have at least two subsets of first heating elements, the first heating elements within each subset are connected by heating pipelines, the subsets are not connected to each other by heating pipelines, different heating fluids are used for heating each subset of first heating elements,
the second heating elements have at least two subsets of second heating elements, the second heating elements within each subset are connected by heating pipelines, the subsets are not connected to each other by heating pipelines, different heating fluids are used for heating each subset of second heating elements, and
the different heating fluids differ in a property selected from the group consisting of pressure, composition, source of the heating fluid, and temperature.

11. The process of claim 5, wherein the amount of heating elements arranged in or around the first and second branch line is the same or the length of the first and second branch line is the same.

12. The process of claim 5, wherein the first and second branch lines have straight sections that are partially or fully insulated using insulation elements and the bends are not insulated with the insulation elements.

13. The process of claim 1, wherein the polymer obtained in step d) is a low-density polyethylene (LDPE).

14. The process of claim 1, wherein the reaction fluid further comprises propionic aldehyde or propylene.

15. The process of claim 1, wherein the reaction fluid is a supercritical fluid in steps b) to d).

16. A process for the preparation of ethylene homopolymers or copolymers in a facility having i) a high-pressure tubular reactor used in a continuous flow mode with a reaction fluid comprising ethylene being introduced into the reactor at a reactor inlet and polymer leaving the reactor at a reactor outlet and ii) a preheater having an inlet, an outlet, a first preheater unit is arranged on a first branch line, and a second preheater unit is arranged on a second branch line, comprising the steps of:
a') providing a first flow of compressed reaction fluid comprising a first portion of the reaction fluid and providing a second flow of compressed reaction fluid comprising a second portion of the reaction fluid by, in any order, compressing the reaction fluid to an elevated pressure and splitting at least a portion of a single flow of the reaction fluid into the first flow and the second flow of compressed reaction fluid;
b') conducting the first flow of the first portion of the reaction fluid through the first preheater unit and heating the first portion of the reaction fluid in the first preheater unit, and conducting the second flow of the second portion of the reaction fluid through the second preheater unit and heating the second portion of the reaction fluid in the second preheater unit;
c') combining the first and second portion of the reaction fluid by recombining the first flow and the second flow of the reaction fluid and introducing the recombined flow of the reaction fluid heated in step b') into the reactor at the reactor inlet; and
d') polymerizing the reaction fluid at the elevated pressure in the presence of free-radical polymerization initiators in the reactor, thereby yielding a polymer selected from the group consisting of ethylene homopolymers and ethylene copolymers,
wherein the average velocity of the reaction fluid at the outlet of the preheater is lower than the average velocity of the reaction fluid in the tubular reactor at the reactor inlet and the ratio of the average velocity of the reaction fluid in the tubular reactor at the reactor inlet to the average velocity of the reaction fluid in the preheater at the outlet of the preheater is in the range from 1.5 to 5.

17. The process of claim 16, wherein, in step a'), a single flow of the reaction fluid is compressed to an elevated pressure and thereafter at least a portion of the flow is split at a junction appliance, into the first flow comprising the first portion of the reaction fluid and into the second flow comprising the second portion of the reaction fluid.

18. The process of claim 16, wherein the polymer obtained in step d') is a low-density polyethylene (LDPE).

19. The process of claim 16, wherein the reaction fluid is a supercritical fluid in steps b') to d').

* * * * *

UNITED STATES PATENT AND TRADEMARK OFFICE
CERTIFICATE OF CORRECTION

PATENT NO. : 11,155,649 B2
APPLICATION NO. : 16/636804
DATED : October 26, 2021
INVENTOR(S) : Wolf et al.

It is certified that error appears in the above-identified patent and that said Letters Patent is hereby corrected as shown below:

On the Title Page

Column 1, Item (30), Line 1, delete "17186697" and insert -- 17186697.3 --, therefor In the Specification In Column 14, Line 1, after "unit" insert -- (1) --

Signed and Sealed this
Thirty-first Day of January, 2023

Katherine Kelly Vidal
*Director of the United States Patent and Trademark Office*